UNITED STATES PATENT OFFICE.

WILLIAM S. TISDALE, OF NEW YORK, N. Y.

IMPROVEMENT IN PREPARING PEAT FOR FUEL.

Specification forming part of Letters Patent No. 131,577, dated September 24, 1872; antedated September 21, 1872.

*To all whom it may concern:*

Be it known that I, WILLIAM S. TISDALE, of New York, in the county and State of New York, have invented a new and Improved Mode of Preparing Peat for Fuel; and I do hereby declare that the following is a full, clear, and exact description of my invention which will enable others to perform and use the same.

The nature of my invention consists in an improvement in the preparation of peat for use as fuel whereby it is dried rapidly and economically, while, at the same time, the cakes or blocks into which it may be formed are rendered more tenacious, harder, and better fitted for transportation and service as fuel. My improvement consists in mixing with peat when saturated with water as it comes from a peat bed, a small proportion of unslaked lime or other suitable substance, which enters into chemical combination with the water contained in the peat rendering it by the absorption comparatively dry.

For accomplishing this object the unslaked lime is ground or pulverized quite fine and is then incorporated thoroughly with the wet peat by feeding the powdered lime with the peat into the hopper of a cutting or compressing peat-machine, or in any convenient manner. The quantity of lime required to produce the desired result will vary under different circumstances, but need not ordinarily exceed ten per cent. of the weight of the peat. Lime enough only is required to take up the excess of water contained by the peat, the evaporation of which usually makes the process of drying a slow and expensive operation. The amount of lime added should never be sufficient to absorb all the water in the peat, as it should remain moist enough to be of a pasty consistency, so that it will form into compact adhesive cakes or blocks.

It will be readily understood that when peat has been thus prepared by the addition of lime it will possess the quality of mortar, and that the blocks into which it may be formed will harden quickly and possess great solidity and tenacity. Peat thus prepared will contain so small a portion of water in a free or mechanical composition that it will dry by ordinary evaporation very rapidly. The time commonly required for drying peat in its natural state, saturated with water, when exposed in the open air or under cover to render it fit for handling, transporting, and using as fuel is about thirty days; but, when prepared in the manner hereinbefore described, it will dry sufficiently in less than two day's exposure to the open air. The blocks of peat, when dry enough to handle and transport, will not crumble and waste by abrasion any more than coke or coals, and, on account of their greater hardness and tenacity than peat prepared in the usual way, they will be much better for fuel, especially for making steam, as open spaces will be preserved for the draft in the furnace. My prepared peat will be applicable to the manufacture of iron, as it may be made strong enough to bear the burden of a blast furnace by the addition of a larger proportion of lime, which will serve as a flux. For some purposes sand or earthy matters may also be advantageously added with the lime to the peat.

Having described my invention and the mode of performing the same practically, what I claim, and desire to secure by Letters Patent of the United States, is—

An improvement in preparing peat for use as fuel by mixing unslaked lime or its chemical equivalent with it, in the manner and for the purposes substantially as described.

W. S. TISDALE.

Witnesses:
O. MACDANIEL,
EDWARD O'H. JERVOIS.